Patented May 27, 1930

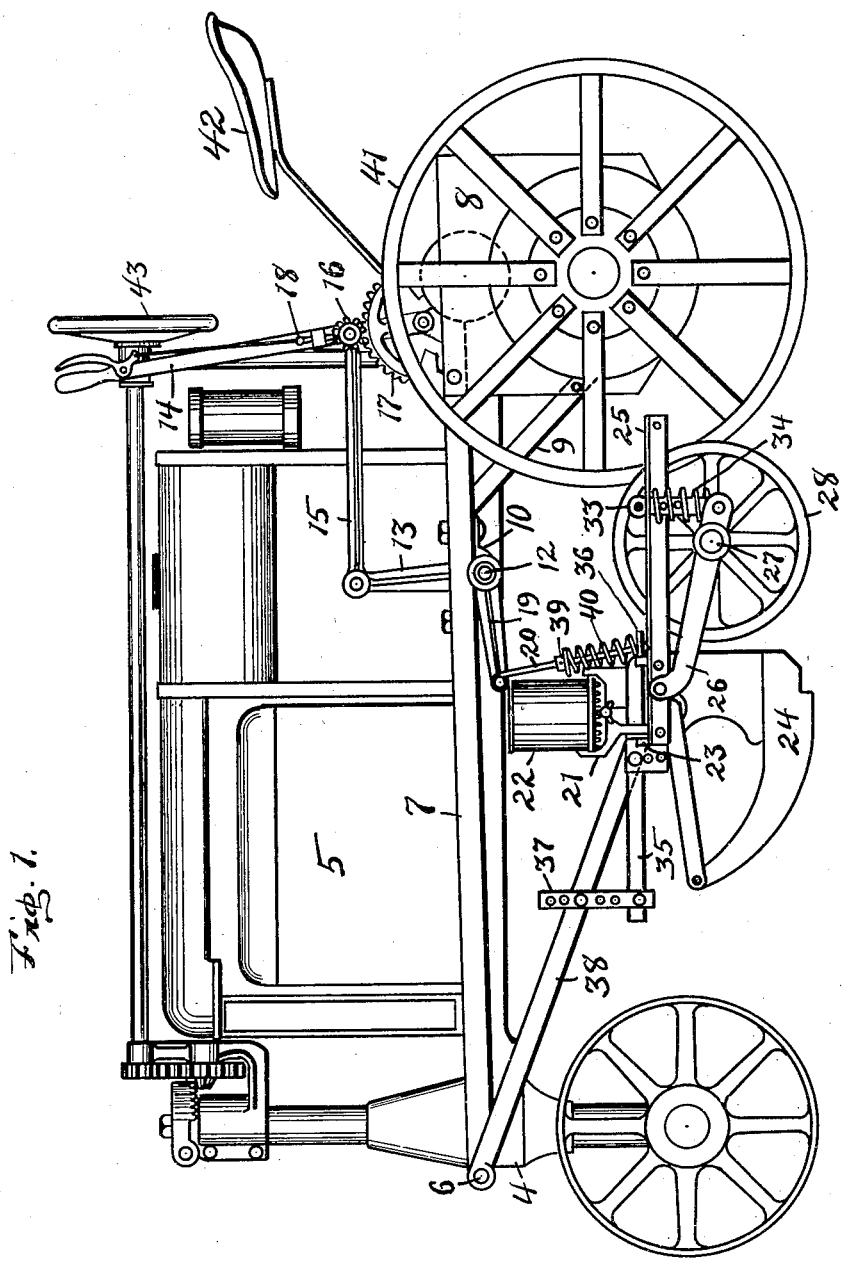

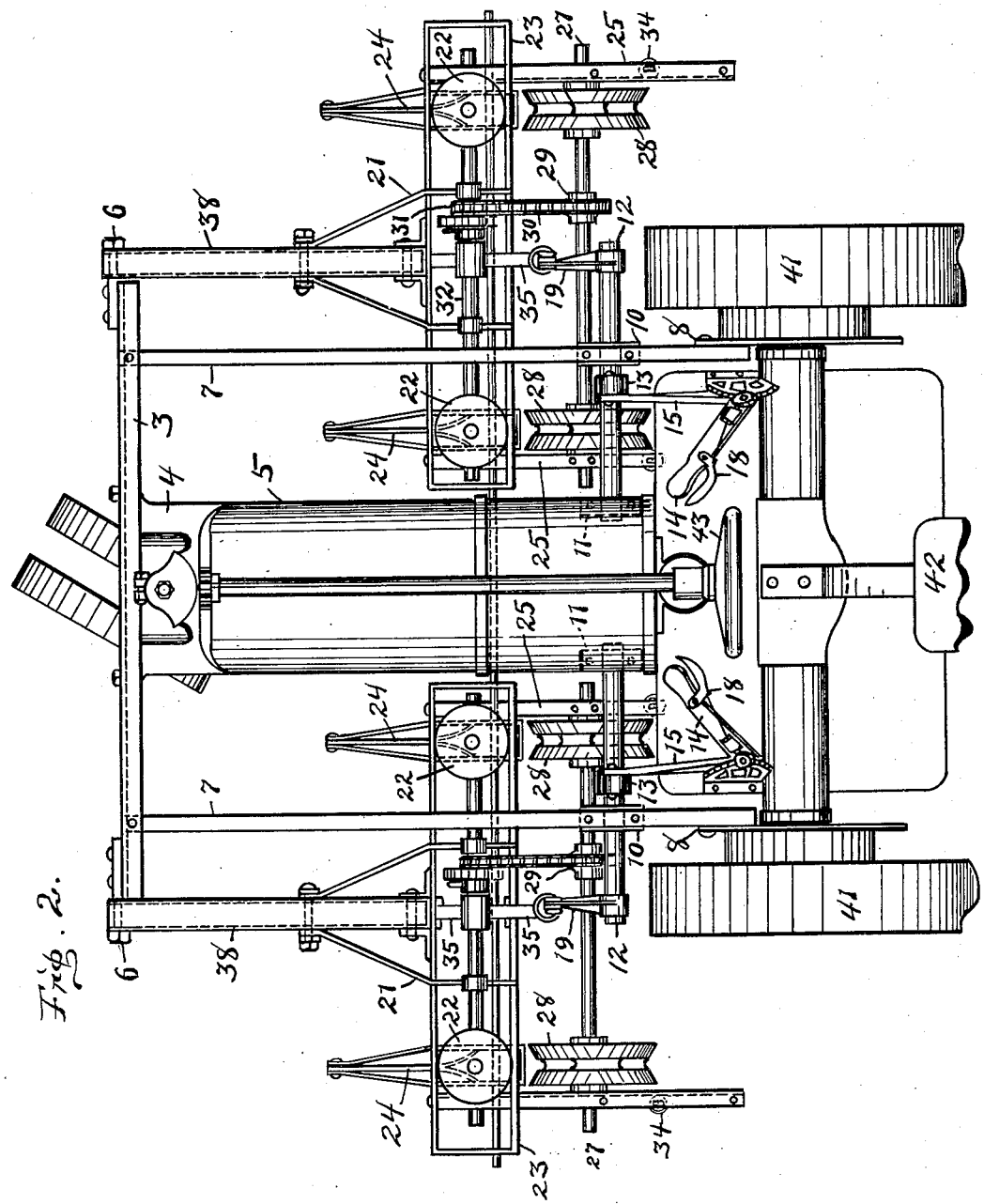

1,760,128

UNITED STATES PATENT OFFICE

CHARLES A. ENZ, OF FORT WAYNE, INDIANA

FARM-IMPLEMENT ATTACHMENT FOR TRACTORS

Application filed September 24, 1928. Serial No. 307,816.

This invention relates to improvements in farm implement attachments for tractors, and the objects thereof are: First, to provide an improved hitch applicable to a tractor by means of which farm implements may be connected to and drawn by the tractor; second, to so construct an appliance by means of which a farm implement is connected to and operated by a tractor in such manner as to facilitate maneuvering of both the tractor and the implement; and third, to afford means in connection with a tractor for operating and manipulating a farm implement that is readily manageable by a single operator while driving the tractor.

These objects are accomplished by the construction illustrated in the accompanying drawings, in which:—

Fig. 1 is a side elevation of a tractor to which the invention is applied; and

Fig. 2 is a plan view of the structure shown in Fig. 1.

The characters appearing in the description refer to parts shown in the drawings and designated thereon by corresponding characters.

In carrying out the invention, a cross beam 3 is secured in its middle portion upon the front of the head block 4 of the tractor 5, each end of the beam having fixed thereon a laterally projecting stud 6. A side beam 7 is disposed longitudinally on each side of the tractor, each beam being secured at its forward end to the cross beam 3 and at its rear end to the corresponding frame plate 8 of the tractor, there being a brace 9 connecting each side beam and the corresponding frame plate for the support of said beam.

Secured to each side beam 7 is a bearing 10, and alined therewith on the tractor is a corresponding bearing 11, in which bearings is mounted a rock shaft 12. Fixed on each rock shaft is an upwardly extending arm 13 that is connected with a corresponding operating lever 14 by means of a connecting rod 15. The operating lever 14 is pivotally supported upon the tractor, and has a pinion 16 pivoted thereon that meshes with a stationary segmental rack 17, and a hand operated latch mechanism 18 on the lever has locking engagement with said pinion, whereby said lever is secured in its various positions of adjustment. Each rock shaft 12 has fixed thereon a forwardly extending arm 19 in the outer end of which is pivoted a connecting rod 20 that has operative relation with an implement hereinafter described.

In the drawings there are shown two implements 21, one disposed upon each side of the tractor, which implements constitute planters of that type used in the planting of grain, such as corn. Each planter has a pair of grain droppers 22 mounted upon a frame 23, and a corresponding pair of ground shoes 24, one for each of said droppers.

The frame 23 of each planter has a pair of rearwardly extending bars 25 fixed thereon at points adjacent the corresponding ends of the frame, and an arm 26 extends beneath each bar and has pivotal connection at its forward end therewith. An axle 27 is journaled in said arms 26 at a point spaced from the rear end thereof, which axle has fixed thereon a pair of ground wheels 28, and also a sprocket wheel 29. The sprocket wheel 29 of each planter is connected by means of a chain 30 with another sprocket wheel 31 that is fixed on a shaft 32, which shaft has actuating relation with each of the droppers 22 on the corresponding planter. In this manner movement is imparted from the ground wheels to the droppers as the planters travel forwardly.

The rear end of each arm 26 has pivotally connected thereto a post 33 that has limited vertical movement in the corresponding bar 25 through which it loosely extends and a compression spring 34 is disposed upon said post between the arm and bar, so that spring suspension is afforded the planters at the rear ends thereof.

Upon the frame 23 of each planter is fixed a forwardly extending beam 35 that has an extension 36 at the rear end thereof, and is connected adjustably by a bar 37 at its forward end to a draw bar 38, which draw bar is pivotally connected at its rear end to the frame 23 of the planter, and at its forward end to the corresponding stud 6 on the cross beam. Each connecting rod 20 extends loosely through the extension 36 of the corresponding beam 35 and has limited vertical movement therein, and has a collar 39 fixed thereon at a point spaced from said extension, between which collar and extension is disposed a compression spring 40. In this manner when the connecting rod 20 is moved downwardly through action of the operating lever 14 downward spring pressure is applied to the planter, and when the connecting rod is raised by the reverse action of the operating lever, the planter is raised accordingly. By adjustment of the bar 37 in its connection with the draw-bar 38 the planter may be elevated or lowered more or less so that the shoes 24 of the planter will extend into the ground to a less or greater depth accordingly.

The planters 21 when connected to the tractor are disposed with respect to the tractor ahead of the drive wheels 41 thereof so that their operation may be readily observed by the operator while positioned upon the seat 42. The operating levers 14 are located upon the tractor adjacent the steering wheel 43 thereof so as to be accessible to the operator while seated. By these arrangements the operator is enabled to control the planters as well as maneuver the tractor while seated, and without the aid of an assistant.

In the operation of the invention, the planters are lifted from the ground and held in suspension, by adjusting the operating levers to their rearwardmost positions, which admits of movement of the tractor to the field for the planting operation. The operating levers 14 are then adjustably moved forward to such extent as to lower the planters so that the shoes enter the ground to the desired depth. The ground-wheels 28 roll upon the surface of the ground and the planters are normally sustained by the springs 34 in such position that the shoes enter the ground to a shallow depth. By moving the operating levers 14 farther forward, downward pressure of the springs 40 is applied to the planters more or less accordingly, which causes the springs 34 to yield to a corresponding extent, and the shoes to enter the ground to increased depth.

As the tractor moves forwardly the wheels 28 roll upon the ground, and the droppers on the planters are actuated through the medium of the chain and sprocket wheel mechanisms provided therefor.

By positioning the planters ahead of the drive-wheels of the tractor, planters of the "two-row type" may be employed, so that the operation in the present instance of planting four rows simultaneously is carried on.

By supporting the planter frames so that their weight is partially borne by the ground-wheels 28 through the medium of the springs 34, the shoes of the planters are maintained at a more or less uniform depth in the ground. The pressure of the springs 40 upon the planters tends to insure maintenance of the desired depth of the shoes in the ground. A further adjustment for regulating the depth of the shoes in the ground is afforded by the bars 37, which, when raised or lowered in their connected relation with the draw bars 38 have the effect of adjusting the shoes of the planters, as to depth in the ground, accordingly.

Maneuvering of the tractor, as at the end of the planted rows, and preparatory to the commencement of planting a second series of rows, is greatly facilitated by raising the planters and holding them suspended out of contact with the ground which is effected by manipulating the operating levers 14 by the operator while seated.

What I claim is:—

1. In combination with a tractor, a cross-beam fixed at its middle portion to the front end of the tractor and provided at each end with a stud; a side beam disposed longitudinally on each side of the tractor, secured to said cross-beam at one end and to the tractor frame at its rear end; a rock-shaft laterally disposed on each side of the tractor and supported by the corresponding side beam, each shaft having a pair of arms fixed thereon; operating means in connection with one of the arms on each of said shafts; two implements disposed respectively at the sides of said tractor ahead of the corresponding drive-wheels thereof, each implement having a draw-bar pivotally connected upon the stud at the corresponding end of said cross-beam; a mechanism for the support of each implement including ground wheels and springs in connected relation with the frame thereof; connecting means between each implement and the other of said pair of arms on the corresponding rock shaft, and having limited play therebetween, there being a spring included in said means bearing upon said implement, whereby the implement may be raised from the ground and held suspended, or downward pressure applied thereto accordingly as the operating means therefor is adjusted; and an adjusting means in connection with the draw bar of each implement for adjustably tilting said implement relative thereto.

2. In combination with a tractor, a cross-beam fixed at its middle portion to the front end of the tractor; a side beam disposed longitudinally on each side of the tractor, secured to said cross-beam at one end and to the tractor frame at its rear end; a rock shaft laterally disposed on each side of the tractor and supported by the corresponding side beam, each shaft having a pair of arms fixed thereon; operating means in connection with one of the arms on each of said shafts; two implements disposed respectively at the sides of said tractor, each having pivotal connection with said cross-beam; a pair of arms pivoted to the frame of each implement; an axle having ground wheels journaled in said arms; springs on said arms in supporting relation with the corresponding implement frame; and a connecting means between each implement and the other of said pair of arms on the corresponding rock-shaft.

3. In combination with a tractor having a cross-beam fixed at the front end thereof; and side members extending rearwardly from said cross-beam; two implements disposed respectively at the sides of said tractor ahead of the corresponding drive-wheels thereof, each implement having a draw-bar pivotally connected with said cross-beam; a wheeled support for the rear end of each implement having pivotal connection therewith; a spring interposed between each support and the corresponding implement frame; and an operating mechanism on said tractor for each implement, whereby said implements may be raised from the ground, or downward pressure is applied thereto and said springs are pressed accordingly as said operating means is adjustably positioned.

In testimony whereof I affix my signature.

CHARLES A. ENZ.